United States Patent [19]

Totani et al.

[11] Patent Number: 5,380,814
[45] Date of Patent: Jan. 10, 1995

[54] AROMATIC POLYCARBONATE AND PROCESS FOR PRODUCTION THEREOF

[75] Inventors: Yoshiyuki Totani; Motokazu Hirao; Tomonori Ito; Masakatsu Nakatsuka, all of Yokohama; Akihiro Yamaguchi, Kamakura, all of Japan

[73] Assignee: Mitsui Toatsu Chemicals, Inc., Tokyo, Japan

[21] Appl. No.: 73,677

[22] Filed: Jun. 8, 1993

[30] Foreign Application Priority Data

Jun. 16, 1992 [JP] Japan .................. 4-156524

[51] Int. Cl.$^6$ .............................................. C08G 64/00
[52] U.S. Cl. ...................................... 528/199; 528/125; 528/126; 528/176; 528/179; 528/182; 528/196; 528/198; 528/201; 528/202; 528/205
[58] Field of Search ............... 528/199, 198, 196, 171, 528/174, 125, 126, 176, 179, 182, 201, 202, 205

[56] References Cited

U.S. PATENT DOCUMENTS

| | | | |
|---|---|---|---|
| 3,173,891 | 3/1965 | Fry et al. | 528/199 |
| 3,184,431 | 5/1965 | Deanin et al. | 528/199 |
| 3,213,059 | 10/1965 | Deanin et al. | 528/199 |
| 3,220,975 | 11/1965 | Fox | 528/199 |
| 3,240,756 | 3/1966 | Deanin et al. | 528/199 |
| 3,275,601 | 9/1966 | Schnell et al. | 528/199 |
| 3,787,359 | 1/1974 | Horn et al. | 260/47 X |
| 3,945,969 | 3/1976 | Horn et al. | 528/199 |
| 3,989,672 | 11/1976 | Vestergaard | 528/199 |
| 4,277,599 | 7/1981 | Mark | 528/199 |
| 4,384,108 | 5/1983 | Campbell et al. | 528/199 |

FOREIGN PATENT DOCUMENTS

| | | |
|---|---|---|
| 014323 | 8/1980 | European Pat. Off. . |
| 391202 | 10/1990 | European Pat. Off. . |
| 472848 | 3/1992 | European Pat. Off. . |
| 2101700 | 7/1972 | Germany . |
| 3-2216 | 1/1991 | Japan . |
| 4-255717 | 9/1992 | Japan . |

*Primary Examiner*—John Kight, III
*Assistant Examiner*—Richard Jones
*Attorney, Agent, or Firm*—Burns, Doane, Swecker & Mathis

[57] ABSTRACT

A process for producing an aromatic polycarbonate by reacting an aromatic dihydroxy compound, an alkali or alkaline earth metal base and a carbonyl halide compound comprises feeding a polymerization catalyst as the carbonyl halide is fed to a mixture of the aromatic dihydroxy compound, the alkali metal or alkaline earth metal, water and an organic solvent. The molecular weight of the aromatic polycarbonate can be properly controlled, the rate of end capping is high, and coloration of the aromatic polycarbonate is less. Such aromatic polycarbonate can be produced while suppressing hydrolysis of the carbonyl halide compound and/or haloformate compound.

12 Claims, No Drawings

AROMATIC POLYCARBONATE AND PROCESS FOR PRODUCTION THEREOF

BACKGROUND OF THE INVENTION

1. Field of the Invention

The present invention relates to a process for producing an aromatic polycarbonate, and more particularly, to a process for producing an aromatic polycarbonate having a controlled molecular weight, a high rate of end capping and less-coloration.

2. Description of the Related Art

Aromatic polycarbonates are engineering plastics having transparency comparable to glass, outstanding impact resistance, excellent heat resistance, dimensional stability, and weatherability in combination.

Further, with respect to the problems of recycling of plastics which are recently discussed, aromatic polycarbonates are thermoplastic polymers and the recycling is easy, and therefore, aromatic polycarbonates are widely used in the field of motor cars, electric machines and the like.

However, in the case of aromatic polycarbonates produced according to conventional methods [for example, feeding phosgene to a two-phase mixture of an aqueous alkali metal salt solution of an aromatic dihydroxy compound in the presence of a monohydric phenol such as p-tert-butylphenol as a molecular weight controlling agent to form an aromatic polycarbonate oligomer having a chloroformate group of a low molecular weight and then polymerizing said oligomer, that is, an interfacial polymerization (cf. H. Schnell, "Chemistry and Physics of Polycarbonate", Interscience Publishing, p. 33–41 (1964))], only about 70–80 mole % of the total end groups of the aromatic polycarbonates is capped, and in particular, there is a drawback that the rate of end-capping of the oligomer region is low.

It is known that in the case of such aromatic polycarbonates having a low rate of end capping there occurs rearrangement of the polymer chain when melted and thereby the molecular weight and the molecular weight destribution change [Kobunshi Kagaku, 21, 505 (1964), J. Polymer Sci., 55, 251 (1961)].

It is known to those skilled in the art that molecular weight and molecular weight distribution most closely relate to physical properties of polymers, and when the above-mentioned phenomena occur, it is clear that physical properties of aromatic polycarbonates are changed or lowered by repeating melt-molding for recycling aromatic polycarbonates.

Therefore, there has been a demand to develop a process for producing an aromatic polycarbonate which has a very high rate of end capping and is difficult to subject to rearrangement of the polymer chain.

In the above-mentioned production method, a method for producing an aromatic polycarbonate is known which comprises adding a polymerization catalyst (also called "polycondensation catalyst") such as a tertiary amine and the like so as to accelerate the polymerization of oligomers (for example, U.S. Pat. No. 3,275,601). According to this method, the addition of the polymerization catalyst is effected after the reaction of a carbonyl halide compound with an aromatic dihydroxy compound is completed and oligomers of the aromatic polycarbonate are formed. However, it is difficult for this method to produce aromatic polycarbonates having a high rate of end capping.

It is also known that a haloformation reaction is carried out in the presence of a polymerization catalyst by adding the polymerization catalyst to the first step of the production of aromatic polycarbonates, that is, a haloformation reaction.

When at the beginning of the reaction there are present the total amounts of the materials necessary for producing an aromatic polycarbonate, that is, a polymerization catalyst, a molecular weight controlling agent, and an alkali metal or alkaline earth metal base in the reaction system, it is difficult to control properly the molecular weight of the aromatic polycarbonate and the resulting molecular weight distribution becomes very wide.

For the purpose of controlling molecular weight properly, for example, U.S. Pat. No. 3,240,756 proposes a method that a molecular weight controlling agent is fed as a carbonyl halide is fed in the case of reacting an aromatic dihydroxy compound with a carbonyl halide compound in the presence of a polymerization catalyst.

However, U.S. Pat. No. 3,240,756 discloses working examples only for using quaternary ammonium salts as the catalyst, and when the present inventors traced said polymerization method by using a tertiary amine, it was very difficult to control the molecular weight. U.S. Pat. No. 3,173,891 discloses that in a process for reacting an aromatic dihydroxy compound with phosgene and an alkali metal hydroxide in an amount sufficient to impart to the reaction system a pH value of 10.5–11.8, there are present a polymerization catalyst and a molecular weight controlling agent to produce an aromatic polycarbonate.

However, according to this process, an aromatic polycarbonate having a controlled molecular weight is obtained, but the polydispersity index (ratio of weight average molecular weight to number average molecular weight) is high and the resulting aromatic polycarbonate has poor heat decomposition resistance and impact resistance.

This is also disclosed in U.S. Pat. No. 3,989,672. This U.S. Patent discloses a process for producing a polycarbonate polymer having improved resistance to thermal degradation and impact resistance consisting of reacting a carbonate precursor with 2,2-bis(4'-hydroxyphenyl) propane ["Bisphenol A"] in an aqueous medium containing sufficient alkali metal hydroxide to maintain a pH between 8.0–10.2 during the reaction. In the embodiment there is described that the molecular weight controlling agent and the polymerization catalyst are present in advance.

According to this process, the rate of end capping of an aromatic polycarbonate can be improved to some extent, but the resulting rate of end capping is not always satisfactory.

The present inventors have traced the reaction of this process where a pH is 8.0–10.2 and found that the reaction starts in such a state that the aromatic dihydroxy compound is not completely dissolved, that is, the aromatic dihydroxy compound still remains in a solid state.

The solubility of bisphenol A in water is 1:2 mol/L at about 40° C. in water of pH 11.2 (this is the best solubility) and about 0.05 mol/L in water of pH 10.5 according to Ind. Eng. Chem. Res., 30, 462 (1991). This indicates that an enormous amount of water is necessary to prepare a solution of bisphenol A at the pH value range of U.S. Pat. No. 3,989,672.

In addition, according to the process for the production disclosed in U.S. Pat. No. 3,989,672, unreacted aromatic dihydroxy compound is often mixed in the resulting aromatic polycarbonate, and the transparency of the resulting aromatic polycarbonate is not good.

This appears to be attributable to a phenomenon that at the beginning of the reaction some amount of an aromatic dihydroxy compound in a solid state is present and the strong agitation necessary for the interfacial reaction conditions causes scattering of the solid aromatic dihydroxy compound, for example, such solid aromatic dihydroxy compound attaches to the upper portion of the reactor and remains unreacted, and the unreacted aromatic dihydroxy compound is mixed into the organic solvent solution of the resulting aromatic polycarbonate.

That is, according to the above-mentioned polymerization method, it is often difficult to produce an aromatic polycarbonate completely free from unreacted aromatic dihydroxy compound.

It is known that unreacted aromatic dihydroxy compound present in an aromatic polycarbonate is a cause of color formation upon melt molding and lowering of molecular weight.

Further, it is known that an aromatic dihydroxy compound is liable to be colored in the presence of a base, and for purposes of preventing coloration it is desirable to dissolve an aromatic dihydroxy compound in a basic aqueous solution at a relatively low temperature (about 20° C. or lower).

However, according to the production process of U.S. Pat. No. 3,989,672, the dissolution of the aromatic dihydroxy compound is effected after the reaction temperature has risen by exothermic reaction of the carbonyl halide compound with the aromatic dihydroxy compound unless any particular cooling means is used, and therefore, it is difficult to produce an aromatic polycarbonate of less coloration.

In addition, Japanese Patent Application Laid-open Nos. Hei 3 - 2216 and Hei 4 - 255717 disclose that an aromatic polycarbonate oligomer is produced by effecting a reaction with phosgene in the presence of a polymerization catalyst at a predetermined concentration. For producing an aromatic polycarbonate from the oligomer of the aromatic polycarbonate produced as mentioned above, a molecular weight controlling agent is added after the aromatic polycarbonate oligomer is produced, and there is a problem that the rate of end capping of the resulting aromatic polycarbonate is low.

In view of the foregoing, according to the methods of prior art, there have not yet been obtained aromatic polycarbonates having a properly controlled molecular weight, a high rate of end capping and less coloration.

SUMMARY OF THE INVENTION

An object of the present invention is to provide a process for producing an aromatic polycarbonate having at least partly a properly controlled molecular weight, a high rate of end capping and less coloration.

Another object of the present invention is to provide an aromatic polycarbonate producible by the above-mentioned process.

According to the present invention, there is provided a process for producing an aromatic polycarbonate comprising reacting an aromatic dihydroxy compound and an alkali metal or alkaline earth metal base with a carbonyl halide compound which comprises:

(i) preparing a two-phase mixture composed of a uniform aqueous solution of an aromatic dihydroxy compound, an alkali metal or alkaline earth metal base and water and an organic solvent, (ii) feeding a carbonyl halide compound to the two-phase mixture with stirring, (iii) feeding a polymerization catalyst thereto as the carbonyl halide compound is fed, and (iv) effecting a haloformating reaction and a polymerization reaction in the presence of a molecular weight controlling agent.

DESCRIPTION OF THE PREFERRED EMBODIMENTS

The present inventors have conducted intensive research for solving the problems of prior art as above, and found that an aromatic polycarbonate free from the above-mentioned drawbacks can be produced by feeding a polymerization catalyst as a carbonyl halide compound is fed, in the presence of a molecular weight controlling agent. The present invention has been completed based on such finding.

According to the present invention, haloformation and polymerization may be simultaneously carried out in the presence of a polymerization catalyst, in the step of the haloformation reaction. By feeding a polymerization catalyst as a carbonyl halide compound is fed, during the haloformation reaction, there can be efficiently produced an aromatic polycarbonate having a properly controlled molecular weight and less coloration.

The aromatic polycarbonate produced by the process of the present invention has a very high rate of end capping. In particular, in the oligomer region, that is, a polymer chain having a molecular weight of 5000 or less, the rate of end capping is much higher than that of an aromatic polycarbonate produced by conventional methods.

In the present invention, the rate of end capping is a ratio (in terms of %) of the end groups capped with a molecular weight controlling agent to the total of the end groups of the aromatic polycarbonate, and is calculated by the following formula, $$\text{Rate of end capping (\%)} = \frac{A}{A + B' + C'} \times 100$$

A: Amount of a molecular weight controlling agent added in the production of an aromatic polycarbonate (mole % based on the mole amount of the aromatic dihydroxy compound)

B': Ratio of hydroxy end group to one mole of the aromatic polycarbonate structure unit (mole %)

C': Ratio of chloroformate end group to one mole of the aromatic polycarbonate structure unit (mole %)

The ratio of hydroxy end group and the ratio of chloroformate end group to one mole of the aromatic polycarbonate structure unit are calculated by using the number of the hydroxy end groups and the number of the chloroformate end groups determined by a bromination method and a silver chloride-titration method, respectively.

The more the number of the hydroxy end groups and the number of chloroformate end groups, the lower the rate of end capping.

The rate of end capping in the oligomer region may be estimated such that GPC (gel permeation chromatography) measurement is made by using a UV detector, then the ratio of absorption at a wavelength of 285 nm to absorption at a wavelength of 266 nm of an oligomer region having a molecular weight of 5000 or less is calculated, and this ratio is used as an estimation standard.

Since the absorption due to an aromatic ring in an aromatic polycarbonate is present at about 266 nm while the absorption due to phenol is present at about 285 nm, the larger the ratio of absorption at 285 nm to that at 266 nm, the more the hydroxy end groups in the aromatic polycarbonate.

Therefore, by determining such absorption ratio of 285 nm to 266 nm at each molecular weight region of GPC measurement, it is possible to estimate the rate of hydroxy end grouping in each molecular weight region. And the rate of end capping in an oligomer region can be estimated based on the rate of the hydroxy end group in the oligomer region having a molecular weight of 5000 or less.

For example, as shown in Comparative Example 2, the rate of end capping of the aromatic polycarbonate produced by the method of U.S. Pat. No. 3,275,601 is about 80%.

Further, the absorption ratio of 285 nm to 266 nm at the oligomer region having a molecular weight of 5000 or less measured by GPC measurement using a UV detector is about 0.1:1.

The change in molecular weight and molecular weight distribution when an aromatic polycarbonate is melted is caused by participation of the hydroxy end group of the polymer chain in the oligomer region in the transesterification.

Therefore, in order to reduce the change in molecular weight and molecular weight distribution when melted, it is necessary to cap sufficiently the end groups of the polymer chain in the oligomer region.

The rate of end capping of the aromatic polycarbonate produced by the process of the present invention is 90% or more, and the absorption ratio of 285 nm to 266 nm of an oligomer having a molecular weight of 5000 or less by GPC measurement using a UV detector is about 0.05:1 or less.

According to the process of the production of the present invention, it is possible to produce an aromatic polycarbonate of which change in molecular weight distribution is extremely suppressed upon melt molding. This can be achieved by the process of the present invention comprising reacting a carbonyl halide compound with an aromatic dihydroxy compound in the presence of a polymerization catalyst and a molecular weight controlling agent and feeding the polymerization catalyst as the carbonyl halide compound is fed.

In addition, according to a further effect of the present invention, the amount of hydrolysis of the carbonyl halide compound is surprisingly less than that in known processes for producing aromatic polycarbonates.

The elements of the present invention are explained further in the following.

According to the process of the present invention, the aromatic polycarbonate is produced by using an aromatic dihydroxy compound, an alkali metal or alkaline earth metal base, water, a molecular weight controlling agent, an organic solvent, a carbonyl halide compound, a polymerization catalyst, and if desired, a branching agent.

The aromatic dihydroxy compound used in the present invention may be a compound of the formula (1) or (2), $$HO-Ar^1-X-Ar^2-OH \quad (1)$$

$$HO-Ar^3-OH \quad (2)$$

where $Ar^1$, $Ar^2$ and $Ar^3$ are independently selected from divalent aromatic groups, and X is a bonding group which bonds $Ar^1$ and $Ar^2$.

$Ar^1$, $Ar^2$ and $Ar^3$ are independently selected from divalent aromatic groups, preferably phenylene or substituted phenylene groups. Substituents of the substituted phenylene groups may be halogen atom, nitro, alkyl, cycloalkyl, alkenyl, aralkyl, aryl, alkoxy and the like.

$Ar^1$ and $Ar^2$ are preferably both p-phenylene, m-phenylene or o-phenylene, or one is p-phenylene and the other is m-phenylene or o-phenylene, and more preferably, both p-phenylene.

X is a bonding group which bonds $Ar^1$ and $Ar^2$, and may be a direct bond, a divalent hydrocarbon group, or a group containing at least one atom other than carbon and hydrogen such as —O—, —S—, —SO—, —SO$_2$—, —CO— and the like.

The divalent hydrocarbon groups include saturated hydrocarbon groups, for example, alkylidene groups such as
methylene group,
ethylene group,
2,2-propylidene group,
cyclohexylidene group and the like,
and further include alkylidene groups having an aryl group or the like as a substituent, and in addition, may be divalent hydrocarbon groups containing an aromatic group or an unsaturated hydrocarbon group.

Examples of the aromatic hydroxy compounds include: bis(hydroxyaryl)alkanes such as
bis(4-hydroxyphenyl)methane,
1,1-bis(4'-hydroxyphenyl)ethane,
1,2-bis(4'-hydroxyphenyl)ethane,
bis(4-hydroxyphenyl)phenylmethane,
bis(4-hydroxyphenyl)diphenylmethane,
bis(4-hydroxyphenyl)-1-naphthylmethane,
1,1-bis(4'-hydroxyphenyl)-1-phenylethane,
2,2-bis(4'-hydroxyphenyl)propane["Bisphenol A"],
2-(4'-hydroxyphenyl)-2-(3'-hydroxyphenyl)propane,
2,2-bis(4'-hydroxyphenyl)butane,
1,1-bis(4'-hydroxyphenyl)isobutane,
2,2-bis(4'-hydroxyphenyl)octane,
2,2-bis(3'-methyl-4'-hydroxyphenyl)propane,
2,2-bis(3'-ethyl-4'-hydroxyphenyl)propane
2,2-bis(3'-n-propyl-4'-hydroxyphenyl)propane,
2,2-bis(3'-isopropyl-4'-hydroxyphenyl)propane,
2,2-bis(3'-sec-butyl-4'-hydroxyphenyl)propane,
2,2-bis(3'-tert-butyl-4'-hydroxyphenyl)propane,
2,2-bis(3'-cyclohexyl-4'-hydroxyphenyl)propane,
2,2-bis(3'-allyl-4'-hydroxyphenyl)propane,
2,2-bis(3'-methoxy-4'-hydroxyphenyl)propane,
2,2-bis(3',5'-dimethyl-4'-hydroxyphenyl)propane,
2,2-bis(2',3',5',6'-tetramethyl-4'-hydroxyphenyl)propane,
2,2-bis(3'-chloro-4'-hydroxyphenyl)propane,
2,2-bis(3',5'-dichloro-4'-hydroxyphenyl)propane,
2,2-bis(3'-bromo-4'-hydroxyphenyl)propane,
2,2-bis(3',5'-dibromo-4'-hydroxyphenyl)propane,
2,2-bis(2',6'-dibromo-3',5'-dimethyl-4'-hydroxyphenyl)propane,
bis(4-hydroxyphenyl)cyanomethane,
1-cyano-3,3-bis(4'-hydroxyphenyl)butane,
2,2-bis(4'-hydroxyphenyl)hexafluoropropane, and the like;

bis(hydroxyaryl)cycloalkanes such as
1,1-bis(4'-hydroxyphenyl)cyclopentane,
1,1-bis(4'-hydroxyphenyl)cyclohexane,
1,1-bis(4'-hydroxyphenyl)-3,3,5-trimethylcyclohexane,
1,1-bis(4'-hydroxyphenyl)cycloheptane,
2,2-bis(4'-hydroxyphenyl)adamantane, and the like;
bis(hydroxyaryl) ethers such as
4,4'-dihydroxydiphenylether,
4,4'-dihydroxy-3,3'-dimethyldiphenylether,
ethyleneglycol bis(4-hydroxyphenyl)ether, and the like;
bis(hydroxyaryl) sulfides such as
4,4'-dihydroxydiphenylsulfide,
4,4'-dihydroxy-3,3'-dimethyldiphenylsulfide, and the like;
bis(hydroxyaryl) sulfoxides such as
4,4'-dihydroxydiphenylsulfoxide,
4,4'-dihydroxy-3,3'-dimethyldiphenylsulfoxide, and the like;
bis(hydroxyaryl) sulfones such as
4,4'-dihydroxydiphenylsulfone,
4,4'-dihydroxy-3,3'-dimethyldiphenylsulfone, and the like;
bis(hydroxyaryl)ketones such
bis(4-hydroxyphenyl)ketone,
bis(4-hydroxy-3-methylphenyl)ketone, and the like;
and further,
6,6'-dihydroxy-3,3,3',3'-tetramethylspiro(bis)indan ["Spirobiindanbisphenol"],
trans-2,3-bis(4'-hydroxyphenyl)-2-butene,
9,9-bis(4'-hydroxyphenyl)fluorene,
3,3-bis(4'-hydroxyphenyl)-2-butanone,
1,6-bis(4'-hydroxyphenyl)-1,6-hexanedione,
1,1-dichloro-2,2-bis(4'-hydroxyphenyl)ethylene,
1,1-dibromo-2,2-bis(4'-hydroxyphenyl)ethylene,
1,1-dichloro-2,2-bis(5'-phenoxy-4'-hydroxyphenyl)ethylene,
α, α, α', α'-tetramethyl- α, α'-bis(4-hydroxyphenyl )-p-xylene,
α, α, α', α'-tetramethyl-α, α'-bis(4-hydroxyphenyl)-m-xylene,
4,4'-dihydroxydiphenyl, and the like.

Other than the above-mentioned aromatic dihydroxy compounds, there may be used hydroquinones, resorcins and the like in a similar manner.

In addition, for example, bisphenols (aromatic dihydroxy compounds) containing an ester bond are also useful which can be produced by reacting 2 moles of bisphenol A with one mole of isophthaloyl chloride or terephthaloyl chloride.

These compounds may be used alone or in combination. In the process of the production according to the present invention, bisphenol A is particularly preferable from the standpoints of ease of availability and physical characteristics of the resulting aromatic polycarbonates.

The alkali metal or alkaline earth metal base (hereinafter called "base") used in the present invention may be a hydroxide of an alkali metal or alkaline earth metal such as sodium hydroxide, potassium hydroxide, calcium hydroxide and the like, preferably easily available sodium hydroxide and potassium hydroxide, and more preferably, sodium hydroxide.

The amount of the base to be used is preferably about 1.0–1.5 times equivalent based on the aromatic dihydroxy compound, more preferably about 1.25–1.50 times equivalent.

When the amount of the base is much less than 1.0 times equivalent based on the aromatic dihydroxy compound, haloformation of the aromatic dihydroxy compound does not proceed so well and the carbonyl halide compound is liable to be hydrolyzed.

When the amount of the base is much more than 1.5 times equivalent based on the aromatic dihydroxy compound, the excess base acts to cause hydrolysis of the carbonyl halide compound and/or haloformate compound, and sometimes the carbonate bond of the resulting aromatic polycarbonnate is cleaved. Therefore, such large amount of the base is not preferable.

The base is usually used in the form of an aqueous solution, and it is preferable that the aromatic dihydroxy compound is dissolved in said aqueous solution and then used for the reaction.

The basic aqueous solution of the aromatic dihydroxy compound is usually liable to be subjected to coloration, and therefore, as an antioxidant, there may be added a reducing agent such as sodium sulfite, hydrosulfite, sodium borohydride and the like when a basic aqueous solution of the aromatic dihydroxy compound is prepared.

Water used for preparing the basic aqueous solution of the aromatic dihydroxy compound may be distilled water, deionized water or the like. According to the present invention, there may be used a waste water formed in the production step of the aromatic polycarbonate as it is, or as a mixture with distilled water, deionized water or the like.

The amount of water used for preparing a basic aqueous solution of an aromatic dihydroxy compound is preferably the minimum amount of water required to dissolve completely the aromatic dihydroxy compound under the conditions that the amount of the base is about 1.0–1.5 times equivalent based on the aromatic dihydroxy compound.

When the amount of water is less than said minimum amount, the aromatic dihydroxy compound is not completely dissolved and therefore, the aromatic dihydroxy compound in the form of solid is scattered during the haloformating reaction or is dissolved after the temperature is elevated and thereby, the resulting aromatic polycarbonate is liable to be colored. Therefore, such small amount of water is not preferable.

On the other hand much water is not preferable since the amount of hydrolysis of the carbonyl halide compound is liable to increase, and the productivity is lowered from the industrial point of view.

Preferable water amount is about 0.8–2.2 liters per one mole of the aromatic dihydroxy compound.

As the organic solvent used in the process of the present invention, there may be used an optional organic solvent as far as it is substantially insoluble in water, inert to the reaction and can dissolve the aromatic polycarbonate.

Examples of the organic solvents include: aliphatic chlorinated hydrocarbons such as
dichloromethane,
chloroform,
1,2-dichloroethane,
1,2-dichloroethylene,
trichloroethane,
tetrachloroethane,
dichloropropane, and the like;
aromatic chlorinated hydrocarbons such as
chlorobenzene,
dichlorobenzene, and the like; and mixtures thereof.

Further, as the organic solvent there may be used a mixture of at least one of the chlorinated hydrocarbons or mixtures thereof with an aromatic hydrocarbon such as toluene, xylene, ethylbenzene and the like, or an aliphatic hydrocarbon such as hexane, heptane, cyclohexane and the like.

A particularly preferable organic solvent is dichloromethane since it can easily dissolve the aromatic polycarbonate, has a low boiling point and can be relatively easily removed from the aromatic polycarbonate.

The amount of the organic solvent is usually preferred such that at the completion of the polymerization the concentration of the aromatic polycarbonate in the organic solvent solution of the aromatic polycarbonate is about 5–35% by weight, particularly preferably, about 10–20% by weight.

When the concentration of the solution of the aromatic polycarbonate is extremely low, a large amount of an organic solvent is required so that the productivity becomes poor.

When the concentration of the solution of the aromatic polycarbonate is near the saturation concentration, the viscosity of the organic solvent solution of the aromatic polycarbonate becomes so high that the efficiency of the interfacial polymerization reaction is lowered and the handling property after polymerization is deteriorated.

It is possible to carry out the polymerization reaction efficiently by using a reduced amount of an organic solvent at the beginning of the reaction and during the reaction, supplementing an organic solvent at an optional time, or by supplementing an organic solvent after the viscosity of the organic solvent solution of the aromatic polycarbonate has increased as the molecular weight of the resulting polycarbonate increases.

When the amount of water used in the reaction is within the range as mentioned above, the volume ratio of the organic phase to water phase in the reaction is preferably 0.7–1.5:1, more preferably 0.8–1.2:1.

When the aromatic polycarbonate is produced using the solvent amount ratio within the above-mentioned range, the mixing can be efficiently effected, and thereby, the aromatic polycarbonate can be stably produced.

Suitable polymerization catalysts usable in the process of the present invention are tertiary amines, quaternary ammonium salts, tertiary phosphines, quaternary phosphonium salts, nitrogen-containing heterocyclic compounds, salts thereof, imino ethers, salts thereof, compounds having an amido group and the like.

A preferred catalyst is a trialkyl amine which is a tertiary amine, a more preferable catalyst is a trialkyl amine having no branches on the carbon atoms at the 1- and 2-positions and each alkyl group is $C_1$–$C_4$ alkyl, for example,
triethylamine,
tri-n-propylamine,
diethyl-n-propylamine, and
tri-n-butylamine.

Triethylamine is particularly preferable since it is easily available and the catalytic effect is excellent.

The amount of the polymerization catalyst is preferably about 0.003–0.7 mole % based on the mole amount of the aromatic dihydroxy compound. More preferably it is 0.009–0.6 mole % based on the mole amount of the aromatic dihydroxy compound, and 0.01–0.4 mole % is particularly preferable.

When the amount of the polymerization catalyst is much less than 0.003 mole %, it does not exhibit sufficiently an effect of forming the aromatic polycarbonate and a long reaction time is required and the effect of suppressing hydrolysis of carbonyl halide compounds and/or haloformate compounds is not substantially recognized.

When the amount of the polymerization catalyst is much more than 0.7 mole %, an aromatic polycarbonate having a large polydispersity index is often produced. This is not so preferable from the standpoints of physical properties of the produced aromatic polycarbonate.

The molecular weight controlling agent used in the process of the present invention is an agent for controlling the molecular weight of the aromatic polycarbonate in the procedure of producing the aromatic polycarbonate.

As the molecular weight controlling agents, there are used, in general, monohydroxy aromatic compounds, and further, there may be used alkali metal or alkaline earth metal salts of monohydroxy aromatic compounds, chloroformate derivatives of monohydroxy aromatic compounds, compounds having monocarboxyl group, alkali metal or alkaline earth metal salts of compounds having monocarboxyl group, acid chloride derivatives of compounds of monocarboxyl group and the like.

Examples of monohydroxy aromatic compounds include:
phenol,
p-tert-butylphenol,
o-cresol,
m-cresol,
p-cresol,
o-ethylphenol,
p-ethylphenol,
p-cumylphenol,
p-phenylphenol,
p-cyclohexylphenol,
p-n-octylphenol,
p-isooctylphenol,
p-nonylphenol,
p-methoxyphenol,
p-n-hexyloxyphenol,
p-isopropenylphenol,
o-chlorophenol,
m-chlorophenol,
p-chlorophenol,
o-bromophenol,
m-bromophenol,
p-bromophenol,
pentabromophenol,
pentachlorophenol,
β-naphthol,
α-naphthol,
2-(4'-methoxyphenyl)-2-(4"-hydroxyphenol)propane,
and the like.

Examples of alkali metal or alkaline earth metal salts of monohydroxy aromatic compounds include sodium salts, potassium salts, calcium salts and the like of the above-mentioned monohydroxy aromatic compounds.

Examples of chloroformate derivatives of monohydroxy aromatic compounds include chloroformate derivatives of the above-mentioned monohydroxy aromatic compounds.

Examples of compounds having monocarboxyl group include: fatty acids such as
acetic acid,
propionic acid,
butyric acid,
valeric acid
caproic acid,
heptanoic acid, caprylic acid
2,2-dimethylpropionic acid,
3-methylbutyric acid,
3,3-dimethylbutyric acid,
4-methylvaleric acid,
3,3-dimethylvaleric acid,
4-methylcaproic acid,
2,4-dimethylvaleric acid,
3,5-dimethylcaproic acid,
phenoxyacetic acid, and the like; and
benzoic acids such as
benzoic acid,
p-propoxybenzoic acid,
p-butoxybenzoic acid,
p-pentyloxybenzoic acid,
p-hexyloxybenzoic acid,
p-octyloxybenzoic acid, and the like.

Examples of alkali metal or alkaline earth metal salts of compounds having monocarboxyl group include sodium salts, potassium salts, calcium salts and the like of the above-mentioned compounds having monocarboxyl group.

Examples of acid chloride derivatives include acid chloride derivatives of the above-mentioned compounds having monocarboxyl group.

These compounds may be used alone or in combination. Phenol, p-cumylphenol or p-tert-butylphenol is preferable from the standpoint of easy availability.

The amount of the molecular weight controlling agent to be used varies depending on the average molecular weight of the end product, i.e. the aromatic polycarbonate.

According to the process of the present invention, the produced aromatic polycarbonate may have a selected average molecular weight by controlling the amount of the molecular weight controlling agent. Taking into consideration various physical properties of the product such as molding processability, resistance to heat decomposition, impact resistance and the like, the weight average molecular weight is preferably about 10000–100000, particularly preferably about 20000–80000.

The amount of the molecular weight controlling agent required for producing the aromatic polycarbonate of the weight average molecular weight of the above-mentioned ranges is preferably about 9.6–0.5 mole %, more preferably about 8.1–1.5 mole % based on the amount of mole of the aromatic dihydroxy compound.

The carbonyl halide compound used in the process of the present invention is usually carbonyl chloride, so-called "phosgene", but may be carbonyl halide compound derived from halogen other than chlorine, for example, carbonyl bromide, carbonyl iodide or carbonyl fluoride.

Carbonyl halides may be used alone or in combination. Further, a compound capable of forming a haloformate group, for example, a dimer of phosgene, i.e. trichloromethylchloroformate, a trimer of phosgene, bis(-trichloromethyl) carbonate, may be used. Usually it is preferable to use phosgene.

The amount of the carbonyl halide compound used in the present invention is preferably about 1.0–1.3 times mole based on the amount of mole of the aromatic dihydroxy compound.

When the amount of the carbonyl halide compound is much less than 1.0 times mole, there remains unreacted aromatic dihydroxy compound resulting in coloration of the aromatic polycarbonate. Further the aromatic polycarbonate thus produced has excess remaining hydroxy end groups and has a low rate of end capping. Therefore, upon melt molding, change of the molecular weight and the molecular weight distribution is liable to become large.

When the amount of the carbonyl halide compound is much more than 1.3 times the molar amount of the aromatic dihydroxy compound, a large amount of oligomers having end portions which are terminated with haloformate end groups, and therefore, the oligomers in the reaction system have excess haloformate end groups as compared with hydroxy end groups. As a result, when the polymerization time is of an ordinary length, there is formed an aromatic polycarbonate of a low molecular weight of which polymerization has been stopped with a haloformate end groups. Therefore, such greater amount is not preferable.

According to the process for producing the aromatic polycarbonate of the present invention, as a carbonyl halide compound is fed to a two-phase mixture of a uniform aqueous solution composed of an aromatic dihydroxy compound, a base and water, and an organic solvent, a polymerization catalyst is fed to carry out the haloformation reaction and the polymerization reaction and the aromatic polycarbonate is produced.

According to the procedure for preparing a two-phase mixture of a uniform aqueous solution composed of an aromatic dihydroxy compound, a base and water and an organic solvent, the two-phase mixture may be prepared by mixing an aromatic dihydroxy compound, a base, water, an organic solvent, and if desired, an antioxidant and stirring to dissolve the aromatic dihydroxy compound, or by preparing, in advance, a uniform aqueous solution of an aromatic dihydroxy compound, a base and water and then feeding an organic solvent thereto.

Further, the two-phase mixture may be prepared by forming a mixture in the form of a suspension composed of an aromatic dihydroxy compound, water and an organic solvent, and dissolving the aromatic dihydroxy compound as an aqueous solution of a base is fed to said mixture.

When a carbonyl halide compound is fed to the two-phase mixture, it is preferable to keep stirring at least sufficiently so as to prevent the separation of the water phase and the organic phase of the two-phase mixture.

According to the process of the present invention, the feeding speed of the carbonyl halide compound to the aromatic dihydroxy compound is preferably about 0.5–2.9 mole % per min., that is, the total amount of carbonyl halide compound is fed over about 35–260 min., more preferably about 0.8–2.6 mole % per min., that is, the total amount of carbonyl halide compound is fed over about 40–160 min., and most preferably about 1.0–1.6 mole % per min., that is, the total amount is fed over about 60–130 min.

When the carbonyl halide compound is fed at the feeding speed in the range as mentioned above, the results are good and changes of various physical properties such as rate of end capping, molecular weight distribution, transparency, heat decomposition resistance and the like are not recognized.

However, when the feeding speed is excessively increased over the above-mentioned range, side reactions increase due to local heating by the vigorous reaction and the like, and as a result, coloration of aromatic polycarbonate occurs. In addition, danger in the operation also increases. Therefore, such excessively high feeding speed is not preferable.

It is not preferable from the standpoint of productivity to employ an excessively lower feeding speed than the above-mentioned range since the time of completion of polymerization is delayed. It is preferable to feed at a speed which is possible on an industrial scale.

The carbonyl halide compound may be fed in any form such as gas, liquid, and solution, for example, when the carbonyl halide compound is phosgene, it is preferable to feed it in the form of gas, but it is also possible to dissolve phosgene in an organic solvent such as dichloromethane and the like so that is can be fed as an organic solvent solution.

The carbonyl halide compound may be fed continuously or intermittently. When feeding continuously, it is preferable to feed it uniformly at a constant speed from the beginning of the haloformation reaction to the completion of the haloformation reaction.

Even when feeding intermittently or feeding at multiple steps by dividing the carbonyl halide compound into multiple portions, it is preferable to divide the feed uniformly.

In addition, according to the present invention, it is also possible to feed continuously the carbonyl halide compound, then stop the feeding for a while and start again the feeding.

The haloformation reaction according to the present invention is a reaction by which a base is used as a hydrochloric acid-removing agent and the hydroxy group of the aromatic dihydroxy compound is reacted with the carbonyl halide compound to produce a haloformate derivative of the aromatic dihydroxy compound or an oligomer having a haloformate end group.

The polymerization reaction according to the present invention is a reaction by which a haloformate derivative of an aromatic dihydroxy compound or an oligomer having a haloformate end group produced by the haloformation reaction is reacted with an aromatic dihydroxy compound or an oligomer having a hydroxy end group to produce an aromatic polycarbonate having a desired molecular weight.

According to the process for producing an aromatic polycarbonate of the present invention, it is a feature to feed a polymerization catalyst as a carbonyl halide compound is fed, and there can be attained control of molecular weight and molecular weight distribution of the resulting aromatic polycarbonate, improvement in the rate of end capping, and decrease in the amount of hydrolysis of the carbonyl halide compound and/or haloformate compound.

On the contrary, when the total amount of a polymerization catalyst is present in the reaction system at the beginning of the reaction before feeding a carbonyl halide compound, the resulting aromatic polycarbonate has a very wide molecular weight distribution and is difficult to mold and process. In addition, it is possible only to produce an aromatic polycarbonate exhibiting a large change in molecular weight distribution when melted.

In the present specification, what is meant by "aromatic polycarbonate having a wide molecular weight distribution" is an aromatic polycarbonate having a polydispersity index (the ratio of a weight average molecular weight to a number average molecular weight) of about 3.0 or more.

In the process for producing an aromatic polycarbonate of the present invention, the molecular weight controlling agent is incorporated in the reaction system when the haloformation reaction is carried out.

It is not preferable to add the molecular weight controlling agent after completion of the haloformation reaction since it is difficult to produce an aromatic polycarbonate having a high rate of end capping which is one subject matter of the present invention.

The method of adding the molecular weight controlling agent may be such that all the amount of the molecular weight controlling agent is added at the beginning of the reaction before feeding the carbonyl halide compound, or such that the molecular weight controlling agent is fed as the polymerization catalyst or the carbonyl halide compound is fed.

Each of the above-mentioned adding methods can produce an aromatic polycarbonate having a controlled molecular weight and a high rate of end capping.

Feeding of the polymerization catalyst may be carried out continuously or intermittently as the carbonyl halide compound is fed.

When the feeding is effected intermitently, the polymerization catalyst is divided and fed at two steps or more, preferably at multiple steps, that is, 10 steps or more. A particularly preferable adding method is that the polymerization catalyst is continuously fed at a constant speed as the carbonyl halide compound is fed.

Other than that, for example, while changing the feeding speed, the catalyst may be fed continuously or intermittently, or during the time between the beginning of feeding the carbonyl halide compound and a time when about 20% by weight of carbonyl halide compound has been fed, feeding of the polymerization catalyst may start.

Further, the polymerization catalyst may be added such that before feeding a carbonyl halide compound, a very small amount of the polymerization catalyst is placed in the reaction system, and as the carbonyl halide compound is fed, the catalyst is continuously or intermittently added.

A continuous feeding speed of the polymerization catalyst varies depending on the above-mentioned feeding speed of the carbonyl halide compound, but is preferably such that the length of the feeding time of the polymerization catalyst is about 60–150% of the length of time required to feed the total amount of the carbonyl halide compound, more preferably about 80–120%, and most preferably about 100%, that is, it is most preferable that the total amount of the polymerization catalyst is fed in the same length of time as the total amount of the carbonyl halide compound.

It is not preferable to lower excessively the feeding speed of the polymerization catalyst since the time when the polymerization is completed is delayed, and the rate of end capping of which improvement is one of the feature of the present invention is lowered.

Neither is it preferable to feed the polymerization catalyst at an extremely higher speed than the feeding speed of the carbonyl halide compound since there is sometimes produced an aromatic polycarbonate having a wide molecular weight distribution, i.e. the molecular weight is not properly controlled, in a manner similar to that at the beginning of the reaction the total amounts of the polymerization catalyst and the molecular weight controlling agent are present in advance and then the reaction is carried out.

According to interfacial reaction conditions for forming an aromatic polycarbonate, at the beginning of the reaction only a minute amount of an aromatic dihydroxy compound is dissolved in the organic phase, but as a carbonyl halide compound is fed, the haloformated aromatic dihydroxy compound is dissolved therein resulting in an increase in the amount of the haloformate compound in the organic phase.

As the haloformate compound increases, the polymerization catalyst is successively fed to the system and thereby the reaction of the haloformate is efficiently effected and the end groups of a low molecular weight region of the aromatic polycarbonate are efficiently endcapped, and as a result, there can be produced an aromatic polycarbonate of which molecular weight is properly controlled.

When a polymerization catalyst is placed in the reaction system before feeding the carbonyl halide compound, the amount of the polymerization catalyst to be present in the reaction system in advance is usually about 0.0025 mole % or less based on the mole amount of the aromatic dihydroxy compound, and preferably, about 0.0020 mole % or less.

When a polymerization catalyst exceeding 0.0025 mole % based on the aromatic dihydroxy compound is present in the reaction system at the beginning of the reaction, as mentioned above, the molecular weight distribution of the resulting aromatic polycarbonate becomes wide, and further it is difficult to obtain an aromatic polycarbonate of a high rate of end capping and therefore, such a large amount of polymerization catalyst at the beginning of the reaction is not preferable.

As a method for feeding a molecular weight controlling agent to the reaction system, said agent may be fed thereto in the form of liquid, solid, an organic solvent solution, an aqueous solution or the like, and the form of an organic solvent solution or an aqueous solution is preferable.

The molecular weight controlling agent may be mixed with a polymerization catalyst and fed continuously or intermittently in the form of an organic solvent solution or an aqueous solution, or may be fed in the form of an organic solvent solution or an aqueous solution without being combined with a polymerization catalyst.

The continuous feeding speed of a molecular weight controlling agent is preferably almost the same feeding speed of the polymerization catalyst as mentioned above.

Further there may be used a feeding method comprising feeding a carbonyl halide compound continuously, feeding a polymerization catalyst continuously as the carbonyl halide compound is fed, and feeding a molecular weight controlling agent intermittently, at multiple steps as the carbonyl halide compound is fed; a feeding method comprising feeding a carbonyl halide compound continuously, feeding a polymerization catalyst as the carbonyl halide compound is fed, and feeding a molecular weight controlling agent continuously as the carbonyl halide compound is fed; and a feeding method comprising feeding a carbonyl halide compound by dividing into multiple fractions and feeding at multiple steps and feeding continuously a polymerization catalyst and a molecular weight controlling agent.

According to the present invention, the polymerization catalyst may be fed in a variety of forms such as liquid, solid, gas, an organic solvent solution, an aqueous solution and the like, and the form of liquid, an organic solvent solution or an aqueous solution is preferable.

The concentration of the polymerization catalyst in an organic solvent solution or an aqueous solution may be optional, and is preferably about 2 ppm—80% by weight.

It is not preferable from the standpoint of productivity to use an excess amount of an organic solvent and water, and it is preferable to employ the above-mentioned amount of an organic solvent and water.

When a polymerization catalyst is fed as an organic solvent solution, the organic solvent solution of the polymerization catalyst is prepared by using an organic solvent preferably in an amount of 40% by weight or less based on the total amount of an organic solvent used in the polymerization reaction, more preferably in an amount of 25% by weight or less based thereon.

When a polymerization catalyst is fed as an aqueous solution, it is preferable that the aqueous solution of the polymerization catalyst is prepared by using water in an amount of about 25% by weight or less based on the water amount necessary for preparing a basic aqueous solution of an aromatic dihydroxy compound.

Further, according to the present invention, if desired, a branching agent may be used for producing a branched aromatic polycarbonate.

The branching agent may be a compound having at least three members, similar or dissimilar, selected from the group consisting of aromatic hydroxy group, chloroformate group, carboxyl group, carbonyl halide group and active halogen atom.

Examples of the branching agents include:
phloroglucinol,
4,6-dimethyl-2,4,6-tris(4'-hydroxyphenyl)hept-2-ene,
4,6-dimethyl-2,4,6-tris(4'-hydroxyphenyl)heptane,
1,3,5-tris(4'-hydroxyphenyl)benzene,
1,1,1-tris(4'-hydroxyphenyl)ethane,
tris(4'-hydroxyphenyl)phenylmethane,
2,2-bis[4',4'-bis(4''-hydroxyphenyl)cyclohexyl]propane,
2,4-bis[1'-(4''-hydroxyphenyl)-1'-methylethyl]phenol,
2,6-bis(2-hydroxy-5'-methylbenzyl)-4-methylphenol,
2-(4'-hydroxyphenyl)-2-(2'',4''-dihydroxyphenyl)-propane,
1,4-bis(4',4''-dihydroxytriphenylmethyl)benzene,
trimesic acid trichloride,
cyanuric acid chloride,
3,5-dihydroxybenzoic acid,
5-hydroxyisophthalic acid,
3,5-dichlorocarbonyloxybenzoic acid,
5-chlorocarbonyloxyisophthalic acid,
3,3-bis(4'-hydroxyphenyl)-2-oxo-2,3-dihydroindole,
3,3-bis(4'-hydroxy-3'-methylphenyl)-2-oxo-2,3-dihydroindole, and the like.

The amount of a branching agent to be used may vary depending on the degree of branching of the intended branched aromatic polycarbonate. It is usually about 0.05–2.0 mole % based on the mole amount of an aromatic dihydroxy compound.

With respect to the time when a branching agent is to be added, it is preferable to add a branching agent to a mixture of an aromatic dihydroxy compound, a base, water and an organic solvent in advance before the reaction, but other methods may be employed, for example, a branching agent in the form as an organic solvent solution or a basic aqueous solution is added to the reaction system at optional time during the reaction procedure.

According to the process of the present invention, the reaction temperature may be about 10° C.—the boiling point of an organic solvent, for example, when dichloromethane is used as a reaction solvent, it is preferable to carry out the reaction at about 10°–40° C.

At a reaction temperature excessively lower than 10° C., the reaction velocity is too slow and is not practical.

When the reaction temperature is excessively higher than 40° C., the solubility of carbonyl halide compound in an organic solvent is so low that the hydrolysis reaction of a carbonyl halide compound and/or a haloformate is accelerated. Therefore, such high temperature is not preferable.

When the organic solvent is dichloromethane, the reaction can be carried out at about 39° C. which is the reflux temperature at atmospheric pressure.

The reaction is usually started at about room temperature and the reaction temperature rises up to the reflux temperature by the exothermic reaction. If desired, it is possible to control the reaction temperature to about 30° C. by using an appropriate cooling device.

The reaction is usually carried out at atmospheric pressure, but if desired, the reaction may be effected at pressure higher than or lower than atmospheric pressure.

According to the present invention, the production of the aromatic polycarbonate is preferably carried out by using a vessel type reactor (called also "tank type reactor"). This vessel type reactor may have optional baffles and the like.

Stirring during the reaction is an important factor in the interfacial reaction. It is preferable to keep the stirring at least at a degree which is enough to prevent the separation between water phase and an organic solvent phase.

Excessively vigorous stirring is not preferable since it accelerates hydrolysis of carbonyl halide compounds and/or haloformate compounds.

Excessively inefficient stirring is not preferable since the reaction under the interfacial conditions does not efficiently proceeds.

The stirring conditions are affected by the shape of the polymerization vessel where the reaction is carried out, the shapes of the stirring vanes and the like, and therefore, it is not possible to indicate preferable stirring conditions by the number of rotations of a stirrer, but it is possible to obtain preferable stirring conditions suitable for the reactor by a simple experiment.

It is usually preferable to carry out a haloformation reaction under stirring conditions enabling to mix substantially uniformly an organic solvent phase and water phase.

Further, after completion of feeding a carbonyl halide compound, stirring may be continued for an optional length of time. By continuing the stirring, it is possible to react completely the haloformate end group and the hydroxy end group still remaining in small amounts when feeding of the carbonyl halide compound is finished.

The time for continuing this stirring is about several min.—120 min. and usually about 10–60 min. are enough though the time varies depending of the emulsion state upon reaction, that is, the agitation speed.

According to an example of the process for producing an aromatic polycarbonate of the present invention, in the first step, there is prepared a mixture composed of an aromatic dihydroxy compound, a base, an organic solvent, a molecular weight controlling agent, water of which amount is enough to dissolve the aromatic dihydroxy compound in the presence of a predetermined amount of a base, if desired, a branching agent, and an antioxidant.

In this case, the temperature at which the aromatic dihydroxy compound is dissolved is preferably 20° C. or lower so as to prevent coloration of the aromatic dihydroxy compound when dissolved.

Then, to the above-mentioned mixture is added a carbonyl halide compound over about 35–260 min.

Almost simultaneously with beginning of feeding the carbonyl halide compound, a polymerization catalyst in the form of liquid, an organic solvent solution or an aqueous solution is continuously or intermittently fed to the above-mentioned mixture.

The length of the feeding time of the polymerization catalyst is preferably almost the same as that of the carbonyl halide compound.

The continuous feeding of the polymerization catalyst can be effected by using an appropriate apparatus such as an elaborate pump and the like.

Further, according to the present invention, in the first step, it is also preferable that there is prepared a mixture of an aromatic dihydroxy compound, a base, an organic solvent, water of which is enough to dissolve the aromatic dihydroxy compound in the presence of a predetermined amount of a base, and if desired, a branching agent and an antioxidant, and almost simultaneously with feeding a carbonyl halide compound to said mixture, a polymerization catalyst and a molecular weight controlling agent in the form of liquid, an organic solvent solution, or an aqueous solution are fed to said mixture continuously or intermittently.

The aromatic polycarbonate thus produced is in the form of an organic solvent solution, and is neutralized with an acid and washed with water repeatedly until electrolytes substantially disappear.

Then, the organic solvent is removed from the organic solvent solution of the aromatic polycarbonate by a conventional method to obtain an aromatic polycarbonate.

The aromatic polycarbonate produced according to the process of the present invention can be used as a molding material by mixing with other polymer.

As the other polymer, there may be mentioned:
polyethylene,
polypropylene,
polystyrene,
ABS resin,
poly(methyl methacrylate),
polytrifluoroethylene,
polytetrafluoroethylene,
polyacetal,
polyphenylene oxide,
poly(butylene terephthalate),
poly(ethylene terephthalate),
polyamide,
polyimide,
polyamido-imide,
polyether imide,
polysulfone,
polyether sulfone,
para-oxybenzoyl series polyester,
polyarylate,
polysulfide, and the like.

The aromatic polycarbonate produced according to the process of the present invention may be used alone or in combination with other polymer, and for the purpose of imparting thermal stability upon processing, weatherability, light resistance, flame retarding property, releasability or other properties, there may be added to the aromatic polycarbonate various additives such as thermal stabilizer, antioxidant, ultraviolet ray absorber, releasing agent, organic halogen compound, alkali metal sulfonate, glass fibers, carbon fibers, glass beads, barium sulfate, $TiO_2$ and the like when producing or after producing the aromatic polycarbonate by conventional methods.

The aromatic polycarbonate obtained by the process of the present invention may be used alone or in combination with other polymer, and if desired, the above-mentioned additive is added, and the resulting material may be molded to produce chassis and housing material for electric machine and apparatus, electronic parts, car parts, substrates of information recording mediums such as compact disks and the like, optical materials such as lenses of cameras and spectacles, construction materials substituting for glass and the like.

The aromatic polycarbonate obtained by the process of the present invention is thermoplastic, and in a molten state the aromatic polycarbonate can be molded by injection molding, extruding molding, blow molding, and soaked in fillers. The molding may be easily made by conventional molding methods.

The present invention is explained further in detail referring to examples, but the examples should not be construed as limiting the present invention.

Results of Examples 1–6 and Comparative Examples 1–9 are summarized in Table 1.

The measured values in each example and Comparative Examples were determined by the following methods.

(i) Determination of molecular weight: Number average molecular weight (Mn), weight average molecular weight (Mw) and polydispersity index (Mw/Mn) were measured by GPC.

(ii) Amount of hydrolyzed phosgene and/or chloroformate compound: Calculated from the concentration of sodium carbonate in the water phase after completion of the reaction.

(iii) YI value: A press sheet (1 mm thick) was prepared as a sample. The sample was measured according to a transmission measuring method by means of a color difference meter manufactured by Suga Shikenki K. K. The smaller the YI value, the less the coloration.

(iv) Hydroxyl end group: The number of phenolic hydroxyl groups was measured by a bromination method, and the ratio of the hydroxyl end group to one mole of the aromatic polycarbonate structure unit mas calculated by the following formula.

Hydroxyl end group (mole %)=$B \div 80 \times 254 \div 2 \times 100$

B: Number of phenolic hydroxyl end groups measured by a bromination method (Brg/g)

(v) Chloroformate end group: The number of chloroformate end group was measured by a silver chloride titration, and the ratio of the chloroformate end group to one mole of the aromatic polycarbonate structure unit was calculated by the following formula.

Chloroformate end group (mole %)=$C \times 254 \div 10$

C: Number of chloroformate end groups measured by a silver chloride titration (meq/g)

(vi) Rate of end capping: Calculated by the following formula, $$\text{Rate of end capping (\%)} = \frac{A}{A + B' + C'} \times 100$$

A: Amount of a molecular weight controlling agent added in the production of an aromatic polycarbonate (mole % based on the mole amount of the aromatic dihydroxy compound)

B': Ratio of hydroxyl end group to one mole of the aromatic polycarbonate structure unit (mole %) C': Ratio of chloroformate end group to one mole of the aromatic polycarbonate structure unit (mole %)

(vii) Rate of end capping of the oligomer region: According to GPC (gel permeation chromatography) using a UV detector, 100 μl of a 0.2 weight % solution of the aromatic polycarbonate in chloroform was poured, and the resulting ratio of absorption of UV at a wavelength of 285 nm to that at a wavelength of 266 nm of the oligomer region having a molecular weight of 5000 or less was used for evaluating the rate of end capping of the oligomer region.

The smaller the ratio of absorption at 285 nm to that at 266 nm, the higher the rate of end capping of the oligomer region.

EXAMPLE 1

To a 10 liter-flask having baffles, equipped with a stirrer having three-step six vanes, a reflux condenser, a submerging tube for feeding phosgene, and a feeding port for polymerization catalyst, were added bisphenol A 912 g (4.0 mol), p-tert-butylphenol 20.66 g (0.1377 mol), dichloromethane 3 liters, and deionized water 4 liters to form a suspension liquid, and then the flask was purged with nitrogen to remove oxygen in the flask.

To the above-mentioned suspension liquid were added 2.2 liters of an aqueous solution containing sodium hydrosulfite 1.2 g and sodium hydroxide 432 g (10.8 mol), and bisphenol A was dissolved therein at 15° C.

To the resulting solution was fed phosgene 455.4 g (4.6 mol) at a feeding speed of 7.6 g/min. During feeding the phosgene, triethylamine 0.32 g (0.08 mole % based on the mole amount of bisphenol A) was dissolved in one liter of dichloromethane and fed through the polymerization catalyst feeding port continuously at a speed of 6.7 ml/min.

The reaction temperature rose to 39° C. and reflux of dichloromethane was confirmed.

After completion of feeding phosgene, the reaction fluid was stirred for further 20 min. Then the reaction fluid was stood still and the organic phase was separated and neutralized with hydrochloric acid, followed by washing with deionized water until no electrolyte remained.

To the resulting solution of an aromatic polycarbonate in dichloromethane were added toluene 2 liters and water 5 liters and heated to 98° C. to distill away dichloromethane and toluene resulting in the aromatic polycarbonate powder.

EXAMPLE 2

The procedure of Example 1 was repeated except that 0.64 g (0.16 mole % based on the mole amount of bisphenol A) of triethylamine was used in place of 0.32 g of triethylamine, and an aromatic polycarbonate was produced.

EXAMPLE 3

The procedure of Example 1 was repeated except that the organic solvent solution of triethylamine (0.32 g) in one liter of dichloromethane was continuously fed at a speed of 27.8 ml/min. in place of 16.7 ml/min., and an aromatic polycarbonate was produced.

EXAMPLE 4

The procedure of Example 1 was repeated except that phosgene 495 g (1.25 times the mole amount of bisphenol A) and sodium hydroxide 472 g (11.8 mol) were used in place of phosgene 455.4 g (1.15 times the mole amount of bisphenol A) and sodium hydroxide 432 g (10.8 mol), and an aromatic polycarbonate was produced.

EXAMPLE 5

To a 10 liter-flask having baffles, equipped with a stirrer having three-step six vanes, a reflux condenser, a submerging tube for feeding phosgene and a feeding port for polymerization catalyst and molecular weight controlling agent, were added bisphenol A 912 g (4.0 mol), dichloromethane 3 liters and deionized water 4 liters to form a suspension liquid, and then the flask was purged with nitrogen to remove oxygen in the flask.

To the above-mentioned suspension liquid were added 2.2 liters of an aqueous solution containing sodium hydrosulfite 1.2.g and sodium hydroxide 432 g (10.8 mol) and bisphenol A was dissolved therein at 15° C.

To the resulting solution was fed phosgene 455.4 g (4.6 mol) at a feeding speed of 7.6 g/min. During feeding the phosgene, p-tert-butylphenol 20.66 g (0.1377 mol) and triethylamine 0.32 g (0.08 mole % based on the molar amount of bisphenol A) were dissolved in one liter of dichloromethane and fed through a feeding port for polymerization catalyst and molecular weight controlling agent continuously at a speed of 16.7 ml/min.

The reaction temperature rose to 39° C. and reflux of dichloromethane was confirmed.

After completion of feeding phosgene, the reaction fluid was stirred for further 20 min. Then stirring of the reaction fluid was stopped and the organic layer was separated and neutralized with hydrochloric acid, followed by washing with deionized water until no electrolyte remained.

To the resulting solution of an aromatic polycarbonate in dichloromethane were added toluene 2 liters and water 5 liters and heated to 98° C. to distill away dichloromethane and toluene resulting in the aromatic polycarbonate powder.

EXAMPLE 6

To a 10 liter-flask having baffles, equipped with a stirrer having three-step six vanes, a reflux condenser, a submerging tube for feeding phosgene, and a feeding port for polymerization catalyst and molecular weight controlling agent, were added bisphenol A 912 g (4.0 mol), dichloromethane 3 liters and deionized water 4 liters to form a suspension liquid, and then the flask was purged with nitrogen to remove oxygen in the flask.

To the above-mentioned suspension liquid were added 2.2 liters of an aqueous solution containing sodium hydrosulfite 1.2 g and sodium hydroxide 432 g (10.8 mol), and bisphenol A was dissolved therein at 15° C.

To the resulting solution was fed phosgene 455.4 g (4.6 mol) at a feeding speed of 7.6 g/min.

During feeding the phosgene, p-tert-butylphenol 20.66 g (0.1377 mol) and triethylamine 0.32 g (0.08 mole % based on the mole amount of bisphenol A) were dissolved in one liter of dichloromethane and fed through the feeding port for polymerization catalyst and molecular weight controlling agent intermittently at a rate of 100 ml at intervals of 6 min.

The reaction temperature rose to 39° C. and reflux of dichloromethane was confirmed.

After completion of feeding phosgene, the reaction fluid was stirred for further 20 min. Then stirring of the reaction fluid was stopped, and the organic phase was separated and neutralized with hydrochloric acid, followed by washing with deionized water until no electrolyte remained.

To the resulting solution of an aromatic polycarbonate in dichloromethane were added toluene 2 liters and water 5 liters and heated to 98° C. to distill away dichloromethane and toluene. As a result, the aromatic polycarbonate powder was obtained.

COMPARATIVE EXAMPLE 1

For comparison, after completion of the phosgene treatment, a polymerization catalyst was added to prepare an aromatic polycarbonate.

That is, to a 10 liter-flask having baffles, equipped with a stirrer having three-step six vanes, a reflux condenser, and a submerging tube for feeding phosgene were added bisphenol A 912 g (4.0 mol), p-tert-butylphenol 20.66 g (0.1377 mol), dichloromethane 3 liters and deionized water 4 liters to prepare a suspension liquid, and the flask was purged with nitrogen to remove oxygen in the flask.

To the resulting suspension liquid was added an aqueous solution (2.2 liters) containing sodium hydrosulfite 1.2 g and sodium hydroxide 432 g (10.8 mol), and bisphenol A was dissolved therein at 15° C.

To the resulting solution was fed 455.4 g (4.6 mol) of phosgene at a feeding speed of 7.6 g/min.

The reaction temperature rose to 39° C. and reflux of dichloromethane was confirmed.

After completion of feeding phosgene, triethylamine 0.64 g (0.16 mole % based on the mole amount of bisphenol A) was added and the reaction fluid was stirred for further 60 min. to carry out the polymerization reaction.

Then stirring of the reaction fluid was stopped, and the organic phase was separated, neutralized with hydrochloric acid and washed with deionized water until no electrolyte remained.

To the resulting solution of an aromatic polycarbonate in dichloromethane were added toluene 2 liters and water 5 liters and heated to 98° C. to distill away dichloromethane and toluene to obtain the aromatic polycarbonate powder.

As shown in Table 1, the amount of hydrolyzed phosgene is fairly larger than that in Example 2. Further, the fact that the number average molecular weight of the resulting aromatic polycarbonate is low indicates that phosgene was consumed by hydrolysis of phosgene and the polymerization did not efficiently proceed.

COMPARATIVE EXAMPLE 2

The procedure of Comparative Example 1 was repeated except that phosgene 495 g (1.25 times the mole amount of bisphenol A) and sodium hydroxide 472 g (11.8 mol) were used in place of phosgene 455.4 g (1.15 times the mole amount of bisphenol A) and sodium hydroxide 432 g (10.8 mol), and an aromatic polycarbonate was produced.

As shown in Table 1, excess phosgene was used as compared with Comparative Example 1, and therefore, the resulting number average molecular weight reached the intended value. When compared with the amount of the hydrolyzed phosgene in Example 4, that of Comparative Example 2 is considerably large.

COMPARATIVE EXAMPLE 3

The procedure of Example 1 was repeated except that triethylamine 3.23 g (0.8 mole % based on the mole amount of bisphenol A) was used in place of 0.32 g of triethylamine, and an aromatic polycarbonate was produced.

COMPARATIVE EXAMPLE 4

The procedure of Example 1 was repeated except that 0.001 g of triethylamine (0.00025 mole % based on the mole amount of bisphenol A) was used in place of 0.32 g of triethylamine, and an aromatic polycarbonate was produced.

As shown in Table 1, the resulting aromatic polycarbonate had a low molecular weight and the aromatic polycarbonate was not sufficiently formed. Therefore, it was clear that a longer polymerization time was necessary so as to obtain a satisfactory aromatic polycarbonate.

COMPARATIVE EXAMPLE 5

For comparison, a polymerization catalyst and a molecular weight controlling agent were placed in the reaction system in advance and the reaction with phosgene and the polymerization were carried out.

That is, to a 10 liter-flask having baffles, equipped with a stirrer having three-step six vanes, a reflux condenser, and a submerging tube for feeding phosgene, were added bisphenol A 912 g (4.0 mol), p-tert-butylphenol 20.66 g (0.1377 mol), dichloromethane 3 liters, deionized water 4 liters and triethylamine 0.64 g (0.16 mole % based on the mole amount of bisphenol A) to prepare a suspension liquid, and then the flask was purged with nitrogen to remove oxygen in the flask.

Then, to the suspension liquid was added 2.2 liters of an aqueous solution containing sodium hydrosulfite 1.2 g and sodium hydroxide 432 g (10.8 mol), and bisphenol A was dissolved therein at 15° C.

To the resulting solution was fed phosgene 455.4 g (4.6 mol) at a feeding speed of 7.6 g/min.

The reaction temperature rose to 39° C. and reflux of dichloromethane was confirmed.

After completion of feeding phosgene, the reaction fluid was stirred for further 20 min. Then stirring of the reaction fluid was stopped, and the organic phase was separated, neutralized with hydrochloric acid and washed with deionized water until no electrolyte remained.

To a solution of an aromatic polycarbonate in dichloromethane thus obtained were added toluene 2 liters and water 5 liters and heated to 98° C. to distill away dichloromethane and toluene to give the aromatic polycarbonate powder.

COMPARATIVE EXAMPLE 6

For comparison, a reaction with phosgene was carried out in the presence of a polymerization catalyst without adding any molecular weight controlling agent, and after completion of the reaction with phosgene, a molecular weight controlling agent was added to carry out the production of an aromatic polycarbonate.

That is, to a 10 liter-flask having baffles, equipped with a stirrer having three-step six vanes, a reflux condenser and a submerging tube for feeding phosgene, were added bisphenol A 912 g (4.0 mol), dichloromethane 3 liters, deionized water 4 liters and triethylamine 0.32 g (0.08 mole % base on the mole amount of bisphenol A) to prepare a suspension liquid, and the flask was purged with nitrogen to remove oxygen in the flask.

Then, to the suspension liquid was added 2.2 liters of an aqueous solution containing sodium hydrosulfite 1.2 g and sodium hydroxide 432 g (10.8 mol), and bisphenol A was dissolved therein at 15° C.

To the resulting solution was fed phosgene 455.4 g (4.6 mol) at a feeding speed of 7.6 g/min.

The reaction temperature rose to 39° C. and reflux of dichloromethane was confirmed.

After completion of feeding phosgene, p-tert-butylphenol 20.66 g (0.1377 mol) was added, and the reaction fluid was stirred for further 60 min. to effect the polymerization reaction. Then stirring of the reaction fluid was stopped, and the organic phase was separated, neutralized with hydrochloric acid and washed with deionized water until no electrolyte remained.

To a solution of an aromatic polycarbonate in dichloromethane thus obtained were added toluene 2 liters and water 5 liters and heated to 98° C. to distill away dichloromethane and toluene to give the aromatic polycarbonate powder.

COMPARATIVE EXAMPLE 7

The procedure of Comparative Example 6 was repeated except that the polymerization catalyst was continuously fed simultaneously with feeding phosgene in place of incorporating the polymerization catalyst in the reaction system in advance, and an aromatic polycarbonate was produced.

COMPARATIVE EXAMPLE 8

For comparison, a polymerization catalyst was placed in a reaction system, and a molecular weight controlling agent was continuously fed simultaneously with feeding phosgene to produce an aromatic polycarbonate.

That is, to a 10 liter-flask having baffles, equipped with a stirrer having three-step six vanes, a reflux condenser, a submerging tube for feeding phosgene and a feeding port for a molecular weight controlling agent, were added bisphenol A 912 g (4.0 mol), dichloromethane 3 liters, deionized water 4 liters and triethylamine 0.32 g (0.08 mole % based on the mole amount of bisphenol A) to form a suspension liquid. The flask was purged with nitrogen to remove oxygen in flask.

Then, to the suspension liquid was added 2.2 liters of an aqueous solution containing sodium hydrosulfite 1.2 g and sodium hydroxide 432 g (10.8 mol), and bisphenol A was dissolved therein at 15° C.

To the resulting solution was fed phosgene 455.4 g (4.6 mol) at a feeding speed of 7.6 g/min.

During feeding the phosgene, p-tert-butylphenol 20.66 g (0.1377 mol) was dissolved in dichloromethane 1 liter and continuously fed to the flask through the feeding port for molecular weight controlling agent at a speed of 16.7 ml/min.

The reaction temperature rose to 39° C. and reflux of dichloromethane was confirmed.

After completion of feeding phosgene, the reaction fluid was stirred for further 20 min. Then the reaction fluid was stood still, and the organic phase was separated, neutralized with hydrochloric acid and washed with deionized water until no electrolyte remained.

To a solution of an aromatic polycarbonate in dichloromethane thus obtained were added toluene 2 liters and water 5 liters and heated to 98° C. to distill away dichloromethane and toluene to give the aromatic polycarbonate powder.

As shown in Table 1, there was obtained an aromatic polycarbonate having a wide distribution of molecular weight, that is, the molecular weight having not been properly controlled.

COMPARATIVE EXAMPLE 9

For comparison, a mixture of an organic solvent, a molecular weight controlling agent, a polymerization catalyst, bisphenol A and water was prepared, and phosgene was blown thereinto, and while effecting a reaction with phosgene, an aqueous solution of sodium hydroxide was added to produce an aromatic polycarbonate.

That is, to a 10 liter-flask having baffles, equipped with a stirrer having three-step six vanes, a reflux condenser, a submerging tube for feeding phosgene, a pH measuring electrode, and an inlet for an aqueous solution of sodium hydroxide, were added bisphenol A 912 g (4.0 mol), dichloromethane 3 liters, deionized water 2 liters, triethylamine 1.26 g (0.32 mole % based on the mole amount of bisphenol A, p-tert-butylphenol 20.66 g (0.1377 mol), and sodium hydrosulfite 1.2 g to prepare a suspension liquid. Then the flask was purged with nitrogen to remove oxygen in the flask.

Then, to the solution was fed phosgene 455.4 g (4.6 mol) at a speed of 7.6 g/min. while an aqueous solution of sodium hydroxide (45 weight %) was added subsequentlly so as to adjust the pH value to 9.0.

The reaction temperature rose to 39° C. and reflux of dichloromethane was confirmed. It was observed that bisphenol A in the solid form attached to the upper portion of the flask.

Bisphenol A in the solid form present in the aqueous phase remained until the feeding of phosgene almost finished.

After completion of feeding phosgene, the reaction fluid was stirred for further 60 min. to effect the polymerization.

Then stirring of the reaction fluid was stopped, and the organic phase was separated, neutralized with hydrochloric acid and washed with deionized water until no electrolyte remained.

To the resulting solution of an aromatic polycarbonate in dichloromethane were added toluene 2 liters and water 5 liters, heated to 98° C. to distill away dichloromethane and toluene, and a polycarbonate powder was obtained.

As shown in Table 1, the processes for the production of Examples 1–6 exhibited a low amount of hydrolysis of carbonyl halide compounds and/or haloformate compounds, a uniform molecular weight distribution of the produced aromatic polycarbonate, a high rate of end capping (particularly, the rate of end capping at the oligomer region) and a little coloration (low YI value) as compared with the processes for the production of Comparative Examples 1–9.

The results of the following Reference Examples were measured as show. Heat decomposition resistance (Lowering of molecular weight and change of molecular weight upon melting):

The polymer was kept at a molten state for one hour at 280° C. in an atomosphere of air by using a hot press. During that time, samples at a molten state were taken at 10 min., 30 min., and 60 min., and the molecular weight of each of the samples was measured by GPC (gel permeation chromatography).

By the following formula, the rate of lowering of molecular weight was determined and it was used for evaluating the lowering of molecular weight.

The smaller the Mw' value, the less the lowering of molecular weight upon melting.

Rate of lowering of molecular weight $(Mw') =$ $$\frac{Mw_1 - Mw_2}{Mw_1} \times 100$$

$Mw_1$: Weight average molecular weight before melting
$Mw_2$: Weight average molecular weight after melting Further, as an index indicating the change in distribution of molecular weight due to rearrangement of the high polymer chain when melted, there was determined a change rate of distribution of molecular weight derived from the following formula.

The smaller the value of $(Mw/Mn)'$, the less the change in distribution of molecular weight when melted.

Change rate of distribution of molecular weight $[(Mw/Mn)'] =$ $$\frac{|Mw_1/Mn_1 - Mw_2/Mn_2|}{Mw_1/Mn_1} \times 100$$

$Mw_1/Mn_1$: Distribution of molecular weight before melting
$Mw_2/Mn_2$: Distribution of molecular weight after melting

REFERENCE EXAMPLE 1

The aromatic polycarbonate produced by Example 1 was pelletized by using a 20 mm φ extruder (Two-axis extruder manufactured by Toyo Seiki, the extruding temperature being 270° C.) and the aromatic polycarbonate thus pelletized was dried (120° C., 10 mm Hg, 6 hours) and then melted by means of a hot press (280° C.) and the molten state was kept for one hour.

REFERENCE EXAMPLE 2

The aromatic polycarbonate produced by Comparative Example 2 pelletized by using a 20 mm φ extruder (Two-axis extruder manufactured by Toyo Seiki, the extruding temperature being 270° C.) and the aromatic polycarbonate thus pelletized was dried (120° C., 10 mm Hg, 6 hours) and then melted by means of a hot press (280° C.) and the molten state was kept for one hour.

The results of Reference Examples 1 and 2 are summarized in Table 2.

As is clear from Table 2, the aromatic polycarbonate obtained by the process for the production of Example 1 exhibits less lowering of molecular weight and less change in distribution of molecular weight when melted than the aromatic polycarbonate obtained by the process for the production of Comparative Example 2.

TABLE 1

|  | Amount of phosgene $COCl_2/DH$ | Amount of catalyst a | Mn | Mw | Mw/Mn | Amount of hydrolysis b |
|---|---|---|---|---|---|---|
| Example 1 | 1.15 | 0.08 | 25000 | 49800 | 1.99 | 6.8 |
| Example 2 | 1.15 | 0.16 | 24500 | 50600 | 2.07 | 7.0 |
| Example 3 | 1.15 | 0.08 | 24700 | 48400 | 1.96 | 6.5 |
| Example 4 | 1.25 | 0.08 | 25000 | 50500 | 2.02 | 10.3 |
| Example 5 | 1.15 | 0.08 | 23900 | 51100 | 2.14 | 7.5 |
| Example 6 | 1.15 | 0.08 | 22800 | 49900 | 2.19 | 7.2 |
| Comparative Example 1 | 1.15 | 0.16 | 16500 | 38800 | 2.35 | 14.0 |
| Comparative Example 2 | 1.25 | 0.16 | 24000 | 55700 | 2.32 | 18.6 |
| Comparative Example 3 | 1.15 | 0.80 | 14000 | 59100 | 4.23 | 8.9 |
| Comparative Example 4 | 1.15 | 0.00025 | 13200 | 30600 | 2.32 | 12.0 |
| Comparative Example 5 | 1.15 | 0.16 | 10400 | 134800 | 12.99 | 7.8 |
| Comparative Example 6 | 1.15 | 0.08 | 14700 | 147000 | 10.00 | 10.2 |
| Comparative Example 7 | 1.15 | 0.08 | 19700 | 74700 | 3.79 | 8.0 |
| Comparative Example 8 | 1.15 | 0.08 | 19200 | 67300 | 3.51 | 8.7 |
| Comparative Example 9 | 1.15 | 0.32 | 24300 | 60100 | 2.46 | 8.2 |

|  | c | d | Rate of end capping % | e | YI value |
|---|---|---|---|---|---|
| Example 1 | 0.08 | 0.007 or less | 97.7 | 0.032:4 | 1.15 |
| Example 2 | 0.09 | 0.007 or less | 97.3 | 0.028:1 | 1.18 |
| Example 3 | 0.08 | 0.007 or less | 97.7 | 0.032:1 | 1.16 |
| Example 4 | 0.10 | 0.007 or less | 97.1 | 0.035:1 | 1.18 |
| Example 5 | 0.08 | 0.007 or less | 97.7 | 0.037:1 | 1.17 |
| Example 6 | 0.09 | 0.007 or less | 97.3 | 0.036:1 | 1.16 |
| Comparative Example 1 | 1.58 | 0.007 or less | 68.5 | 0.123:1 | — |
| Comparative Example 2 | 0.98 | 0.007 or less | 77.8 | 0.098:1 | 2.04 |
| Comparative Example 3 | 0.31 | 0.007 or less | 91.7 | 0.056:1 | — |
| Comparative Example 4 | 2.07 | 0.014 | 62.3 | 0.052:1 | — |
| Comparative Example 5 | 0.76 | 0.007 or less | 81.9 | 0.068:1 | — |
| Comparative Example 6 | 1.44 | 0.007 or less | 70.5 | 0.082:1 | — |
| Comparative Example 7 | 1.32 | 0.007 or less | 72.3 | 0.089:1 | — |
| Comparative Example 8 | 0.79 | 0.007 or less | 81.3 | 0.073:1 | — |
| Comparative Example 9 | 0.39 | 0.007 or less | 89.8 | 0.062:1 | 2.32 |

Note on Table 1
DH: Aromatic dihydroxy compound
a: Mole % based on amount of mole of aromatic dihydroxy compound
b: Mole % based on amount of mole of carbonyl halide
c: Ratio of hydroxy end group to one mole of structure unit of aromatic polycarbonate (mole %)
d: Ratio of chloroformate end group to one mole of structure unit of aromatic polycarbonate (mole %)
e: Ratio of absorption at 285 nm to that at 266 nm of oligomer having a molecular weight of 5000 or less when measured according to GPC using a UV detector

TABLE 2

|  | Mw' [10 min.] | (Mw/Mn)' [10 min.] | Mw' [30 min.] | (Mw/Mn)' [30 min.] | Mw' [60 min.] | (Mw/Mn)' [60 min.] |
|---|---|---|---|---|---|---|
| Reference Example 1 | 0.2 | 0.0 | 0.8 | 0.4 | 1.5 | 2.3 |
| Reference Example 2 | 0.8 | 3.6 | 2.7 | 11.7 | 4.2 | 21.3 |

What is claimed is:

1. A process for producing an aromatic polycarbonate comprising reacting an aromatic dihydroxy compound and an alkali metal or alkaline earth metal base with a carbonyl halide compound which comprises:

(i) preparing a two-phase mixture composed of a uniform aqueous solution of an aromatic dihydroxy compound, an alkali metal or alkaline earth metal base and water and an organic solvent, (ii) continuously adding a carbonyl halide compound and a polymerization catalyst to the two-phase mixture with stirring so that the amount of polymerization catalyst in the mixture increases, and (iii) effecting a haloforming reaction and a polymerization reaction in the presence of a molecular weight controlling agent.

2. The process according to claim 1 in which the polymerization catalyst and the carbonyl halide compound are added simultaneously.

3. The process according to claim 1 in which the polymerization catalyst and the carbonyl halide compound are added simultaneously.

4. The process according to claim 1 in which the polymerization catalyst and the carbonyl halide compound are added intermittently.

5. The process according to claim 1 in which the molecular weight controlling agent is present in an organic solvent or a uniform aqueous solution composed of the aromatic dihydroxy compound, an alkali metal or alkaline earth metal base, and water, or is added continuously with the carbonyl halide compound.

6. The process according to claim 1 in which the carbonyl halide compound is added to the two-phase mixture over 35–260 min.

7. The process according to claim 6 in which the polymerization catalyst is added over a time that is of 60–150% of the time required to feed the carbonyl halide compound.

8. The process according to claim 6 in which the polymerization catalyst is added over a time that is of 80–120% of the time required to feed the carbonyl halide compound.

9. The process according to claim 1 in which the amount of the polymerization catalyst is 0.009–0.6 mol based on the aromatic dihydroxy compound.

10. The process according to claim 9 in which the polymerization catalyst is a tertiary amine.

11. An aromatic polycarbonate produced by the process of claim 1 in which the degree of end capping is 90% or more and YI value is 2.0 or less.

12. The aromatic polycarbonate according to claim 11 in which the ratio of absorption of UV at a wavelength of 285 nm to that at a wavelength of 266 nm of the oligomer region having a molecular weight of 5000 or less is 0.05:1 or less as determined by gel permeation chromatograph (GPC) measurement using a UV detector.

* * * * *